(12) United States Patent
Chu

(10) Patent No.: US 6,851,858 B1
(45) Date of Patent: Feb. 8, 2005

(54) MULTI-HELICAL BALL SLEEVE STRUCTURE

(76) Inventor: En Te Chu, No. 1, Alley 16, Lane 40, Jinn Te Rd., Taichung (TW)

( * ) Notice: Subject to any disclaimer, the term of this patent is extended or adjusted under 35 U.S.C. 154(b) by 71 days.

(21) Appl. No.: 10/347,772

(22) Filed: Jan. 17, 2003

(51) Int. Cl.[7] .............................................. F16C 29/04
(52) U.S. Cl. ......................................................... 384/49
(58) Field of Search .............................. 384/49, 48, 30, 384/43

(56) References Cited

U.S. PATENT DOCUMENTS 4,648,727 A * 3/1987 O'Neil et al. .................. 384/49
5,156,462 A * 10/1992 Jacob et al. .................... 384/49

\* cited by examiner

*Primary Examiner*—Lenard A. Footland

(57) ABSTRACT

A multi-helical ball sleeve structure includes a cylindrical ball sleeve formed with a plurality of through holes, and a plurality of balls each received in a respective one of the through holes. The through holes are arranged in an oblique and helical manner. Thus, the multi-helical ball sleeve structure can enhance the lifetime and increase the working efficiency.

2 Claims, 8 Drawing Sheets

MULTI-HELICAL BALL SLEEVE STRUCTURE

BACKGROUND OF THE INVENTION

1. Field of the Invention

The present invention relates to a multi-helical ball sleeve structure, and more particularly to a multi-helical ball sleeve structure that can enhance the lifetime and increase the working efficiency.

2. Description of the Related Art

A working machine, such as a punching bed, is used for processing a workpiece. In general, the punching bed is provided with a plurality of ball sleeves to reduce the friction. A conventional ball sleeve 1 in accordance with the prior art shown in FIGS. 1–3 is mounted on the punching bed to reduce the friction of the punching bed during the working process. The conventional ball sleeve 1 is formed with a plurality of through holes 2 for receiving a plurality of balls 3.

However, the conventional ball sleeve 1 has the following disadvantages.

1. The support points of the conventional ball sleeve 1 are not enough, thereby increasing the bearing pressure of the conventional ball sleeve 1.

2. The contact surface is not evenly distributed, and the friction action is concentrated on the same position, so that the conventional ball sleeve 1 is easily worn out during a long-term utilization.

3. When the conventional ball sleeve 1 is broken, the friction coefficient is increased during the sliding movement, thereby increasing the resistance.

4. The conventional ball sleeve 1 is easily worn out, so that the conventional ball sleeve 1 needs to be replaced frequently, thereby decreasing the working efficiency.

5. The conventional ball sleeve 1 is rotatably and movably mounted in a guide sleeve 4. The balls 3 receiving in the through holes 2 of the conventional ball sleeve 1 have the same circumferential height, so that the guide sleeve 4 is easily worn out during a long-term utilization, thereby increasing the gap between the upper die (not shown) and the lower die (not shown) of the mold (not shown), and thereby wearing the mold.

SUMMARY OF THE INVENTION

The present invention has arisen to mitigate and/or obviate the disadvantage of the conventional ball sleeve.

The primary objective of the present invention is to provide a multi-helical ball sleeve structure that can enhance the lifetime and increase the working efficiency.

Another objective of the present invention is to provide a multi-helical ball sleeve structure, wherein the pressure bearing points of the ball sleeve are increased, thereby reducing the bearing pressure of each point of the ball sleeve.

A further objective of the present invention is to provide a multi-helical ball sleeve structure, wherein the bearing pressure of each point of the ball sleeve is reduced, thereby increasing the lifetime of the ball sleeve, and thereby enhancing the working efficiency of the ball sleeve.

A further objective of the present invention is to provide a multi-helical ball sleeve structure, wherein the force contact face of the ball sleeve is enlarged and the force is distributed evenly, so that the ball sleeve is not easily broken or worn out during a long-term utilization, thereby increasing the lifetime of the ball sleeve.

A further objective of the present invention is to provide a multi-helical ball sleeve structure, wherein the ball sleeve needs not to be replaced frequently, thereby increasing the working efficiency.

In accordance with the present invention, there is provided a multi-helical ball sleeve structure, comprising a cylindrical ball sleeve formed with a plurality of through holes, and a plurality of balls each received in a respective one of the through holes, wherein:

the through holes are arranged in an oblique manner; and the through holes are arranged in a helical manner.

Preferably, the through holes are fully and completely distributed around a whole circumference of the ball sleeve.

Preferably, the distance between the through holes of the ball sleeve is relatively smaller.

Further benefits and advantages of the present invention will become apparent after a careful reading of the detailed description with appropriate reference to the accompanying drawings.

DETAILED DESCRIPTION OF THE INVENTION

Figure 1:
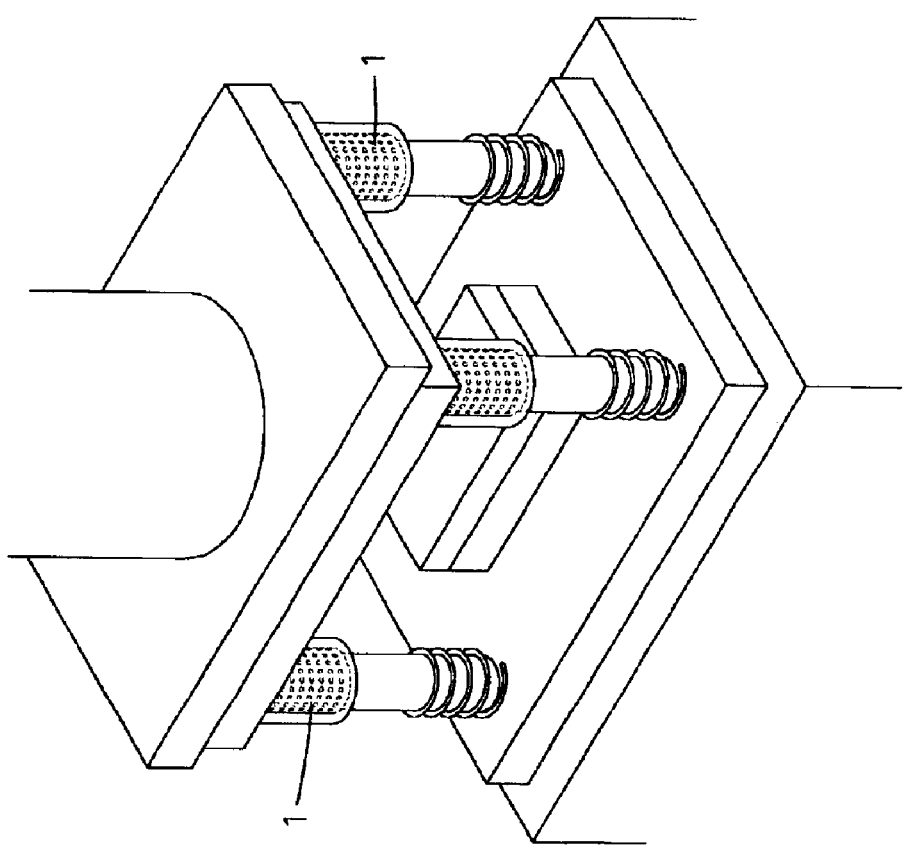
FIG. 1 is a schematic perspective view of a conventional ball sleeve in accordance with the prior art.
Figure 1A:
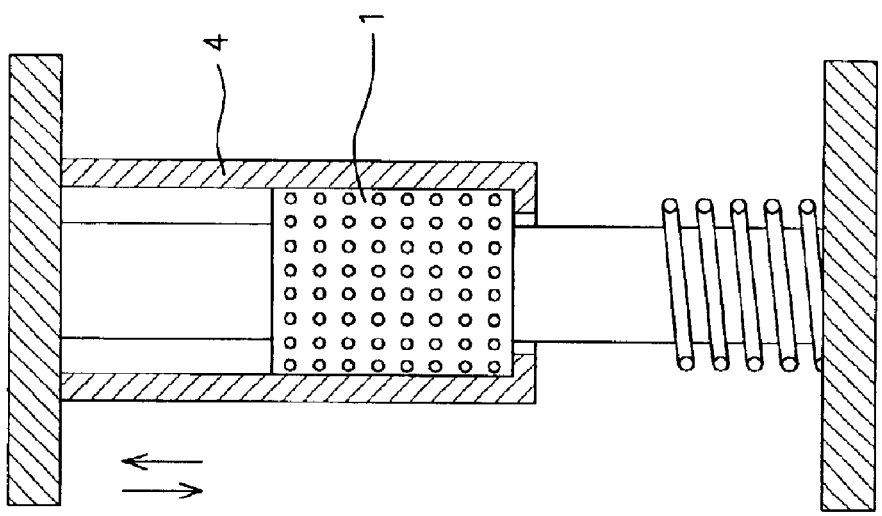
FIG. 1A is a side plan cross-sectional view of the conventional ball sleeve in accordance with the prior art.
Figure 2:
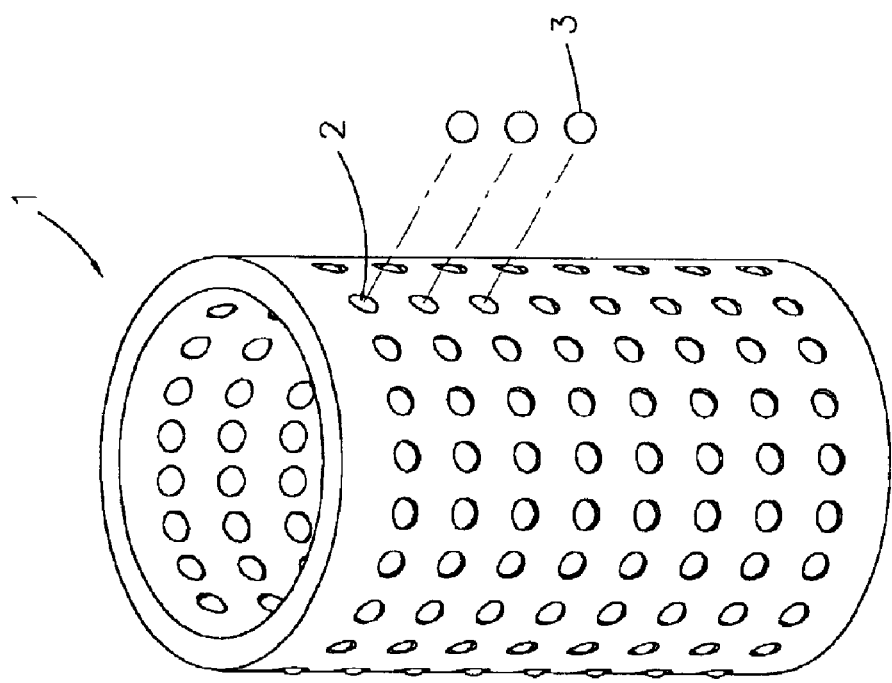
FIG. 2 is a perspective view of the conventional ball sleeve in accordance with the prior art.
Figure 3:
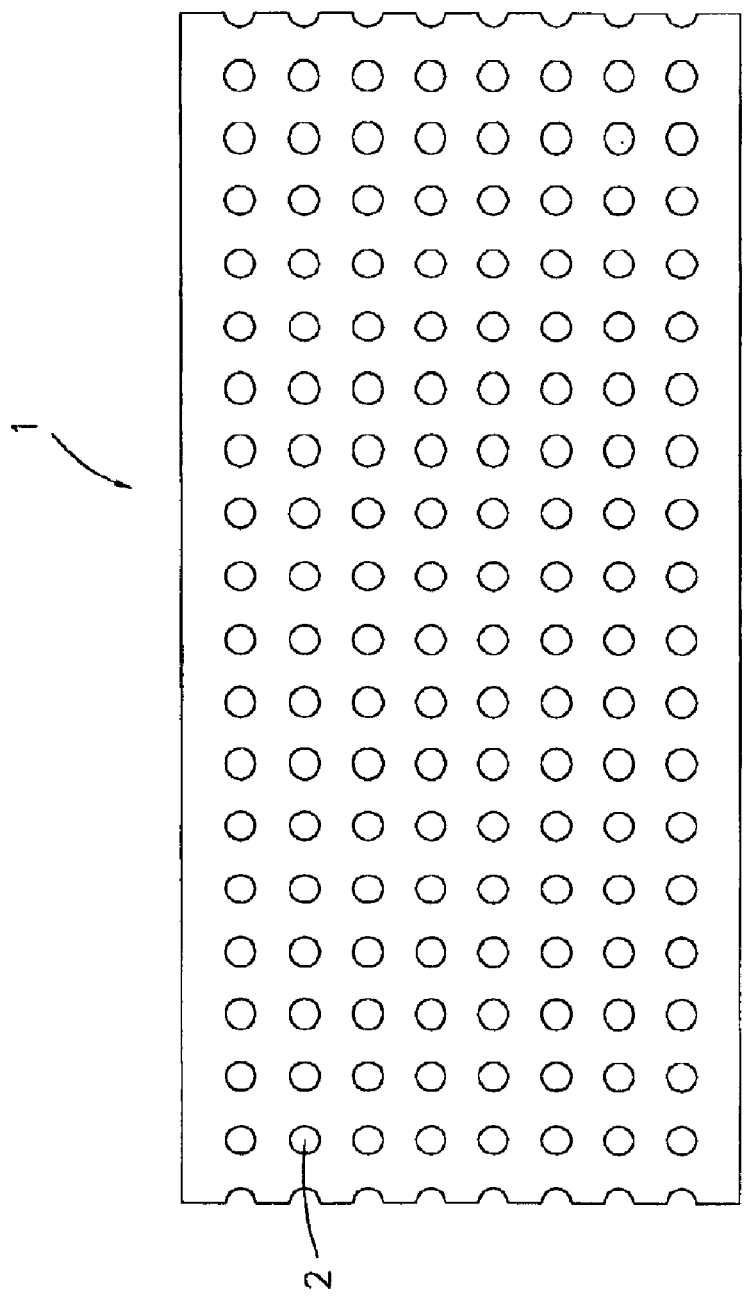
FIG. 3 is a side plan expansion view of the conventional ball sleeve as shown in FIG. 2.
Figure 4:
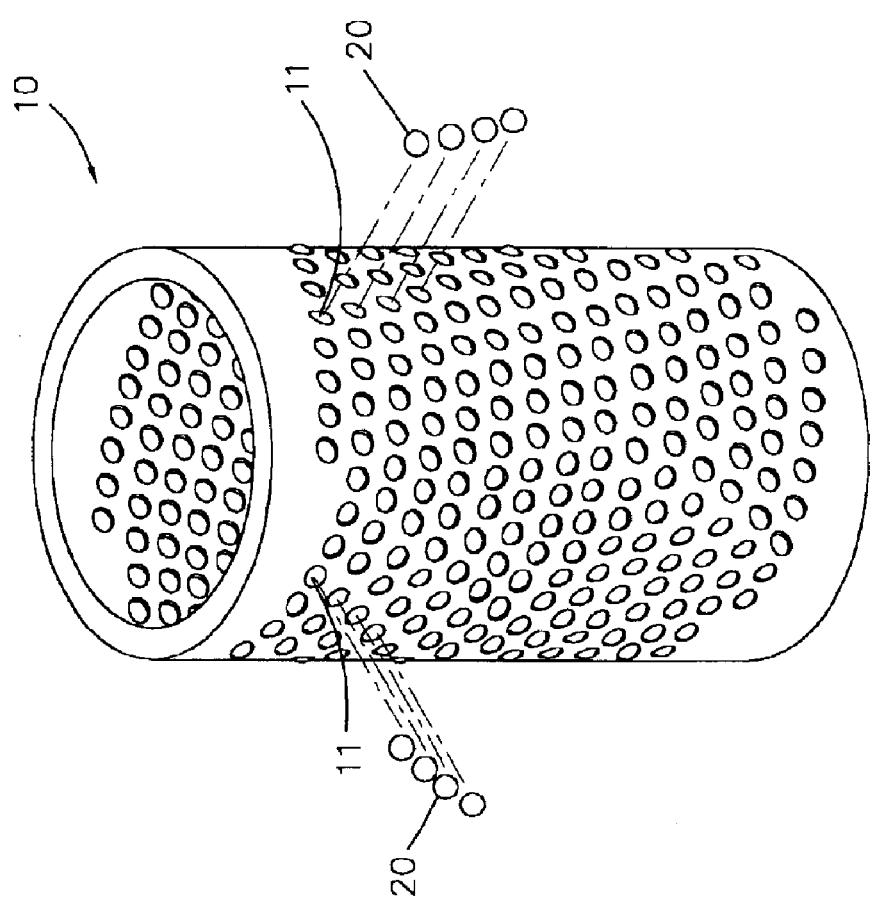
FIG. 4 is an exploded perspective view of a multi-helical ball sleeve structure in accordance with a preferred embodiment of the present invention.
Figure 5:
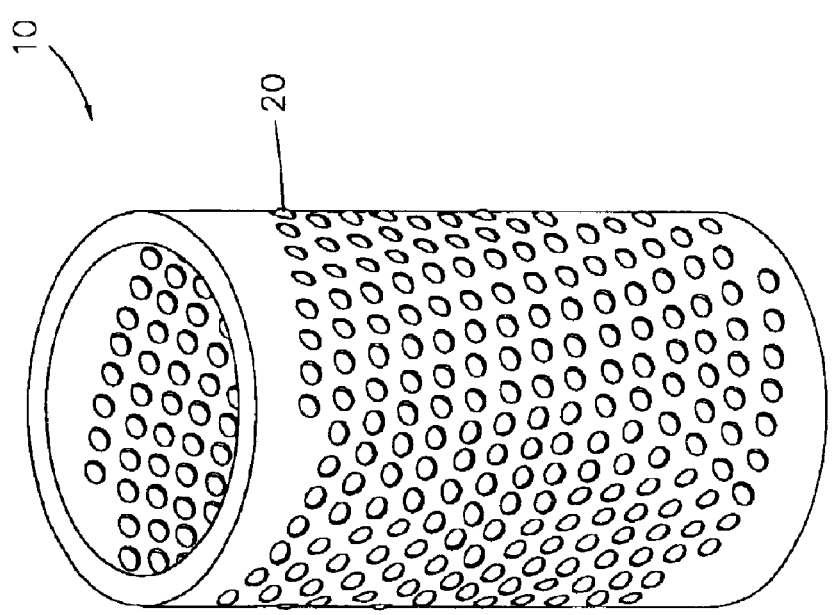
FIG. 5 is a perspective assembly view of the multi-helical ball sleeve structure in accordance with the preferred embodiment of the present invention.
Figure 6:
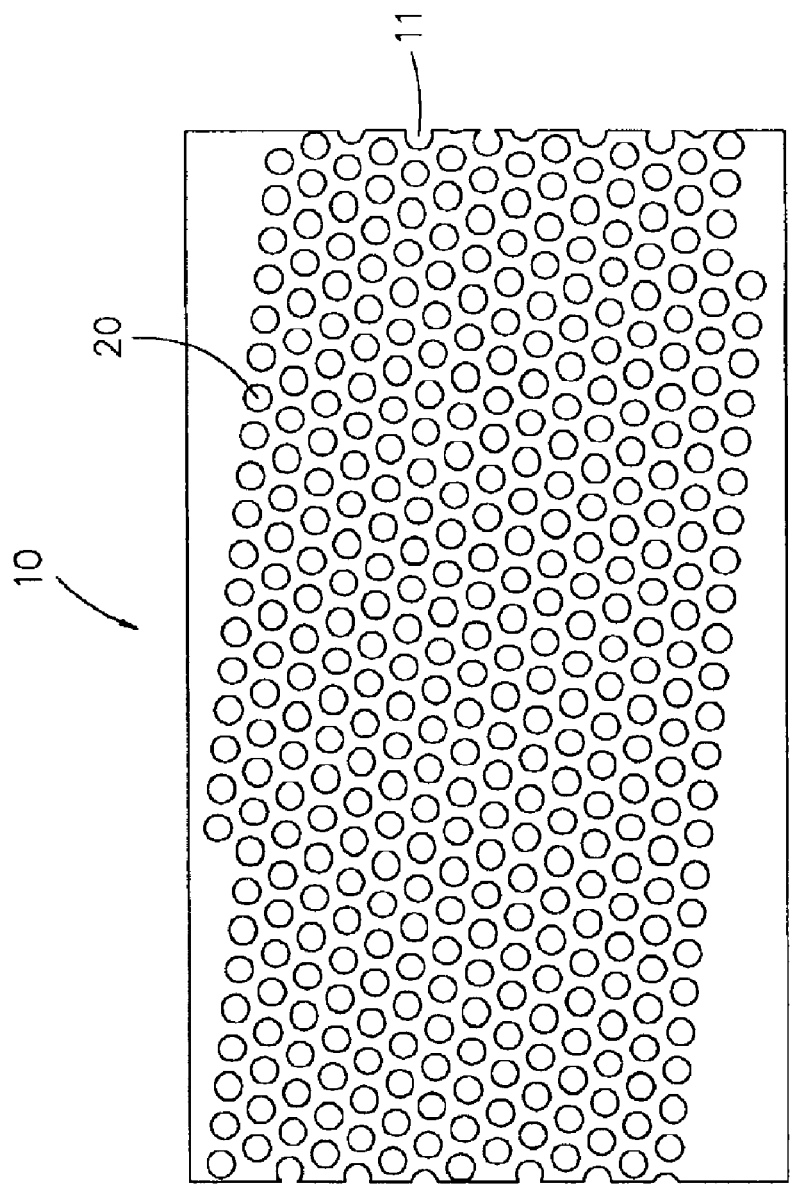
FIG. 6 is a side plan expansion view of the multi-helical ball sleeve structure as shown in FIG. 5.

Referring to the drawings and initially to FIGS. 4–6, a multi-helical ball sleeve structure in accordance with a preferred embodiment of the present invention comprises a cylindrical ball sleeve 10 formed with a plurality of through holes 11, and a plurality of balls 20 each received in a respective one of the through holes 11. The through holes 11 are fully and completely distributed around a whole circumference of the ball sleeve 10. The through holes 11 are arranged in an oblique manner. The through holes 11 are arranged in a helical manner. In addition, the distance between the through holes 11 is relatively smaller. Thus, the bearing pressure of the ball sleeve 10 is reduced, and the lifetime of the ball sleeve 10 is increased.

Figure 7:
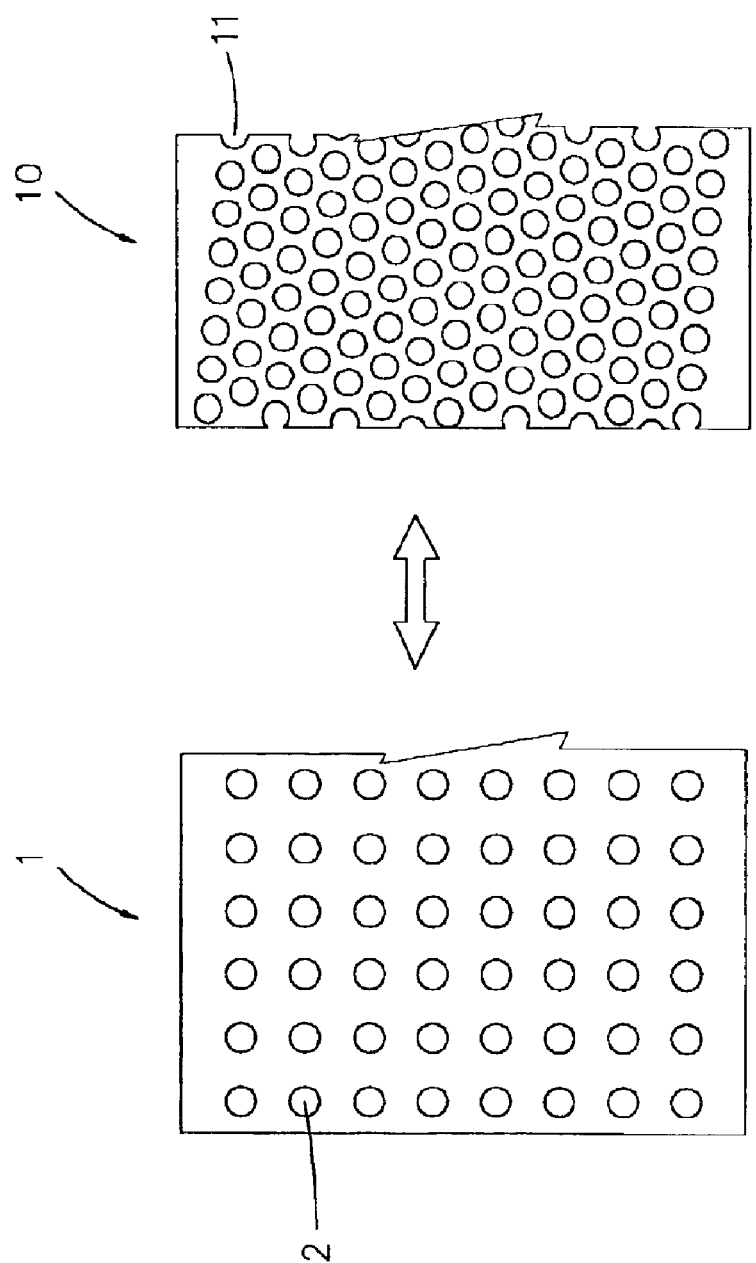
FIG. 7 is a schematic plan expansion view showing the comparison between the multi-helical ball sleeve structure in accordance with the present invention and the conventional ball sleeve in accordance with the prior art.

In comparison, as shown in FIG. 7, the ball sleeve 10 in accordance with the present invention is compared with the conventional ball sleeve 1 in accordance with the prior art.

In the conventional ball sleeve 1, the distance between the through a holes 2 is relatively larger, and the through holes 2 are arranged in a uniform parallel and perpendicular manner. In such a manner, the friction and pressure applied on the conventional ball sleeve 1 are increased, so that the conventional ball sleeve 1 is easily broken and worn out.

In the ball sleeve 10 in accordance with the present invention, the distance between the through holes 11 is relatively smaller, and the through holes 11 are arranged in an oblique and helical manner and are fully and completely distributed around the whole circumference of the ball sleeve 10, so that the pressure bearing points are increased, and the ball sleeve 10 can bear and withstand a greater pressure, thereby increasing the lifetime of the ball sleeve 10.

Thus, the pressure bearing points of the ball sleeve 10 are increased so as to reduce the bearing pressure of each point of the ball sleeve 10, thereby increasing the lifetime of the ball sleeve 10, and thereby enhancing the working efficiency of the ball sleeve 10.

It is appreciated that, the through holes 11 of the ball sleeve 10 are arranged in an oblique and helical manner, so that the ball sleeve 10 in accordance with the present invention forms a multi-helical structure, so that the lateral pressure applied on the ball sleeve 10 is evenly distributed on each of the balls 20, thereby increasing the lifetime of the ball sleeve 10.

Accordingly, the ball sleeve 10 in accordance with the present invention has the following disadvantages.

1. The pressure bearing points of the ball sleeve 10 are increased, thereby reducing the bearing pressure of each point of the ball sleeve 10.

2. The bearing pressure of each point of the ball sleeve 10 is reduced, thereby increasing the lifetime of the ball sleeve 10, and thereby enhancing the working efficiency of the ball sleeve 10.

3. The force contact face of the ball sleeve 10 is enlarged and the force is distributed evenly, so that the ball sleeve 10 is not easily broken or worn out during a long-term utilization, thereby increasing the lifetime of the ball sleeve 10.

4. The ball sleeve 10 needs not to be replaced frequently, thereby increasing the working efficiency.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A multi-helical ball sleeve structure, comprising a cylindrical ball sleeve formed with a plurality of through holes, and a plurality of balls each received in a respective one of the through holes, wherein:

the through holes are arranged in an oblique manner; and the through holes are arranged in a helical manner.

2. The multi-helical ball sleeve structure in accordance with claim 1, wherein the through holes are fully and completely distributed around a whole circumference of the ball sleeve.

* * * * *